Figure 3:
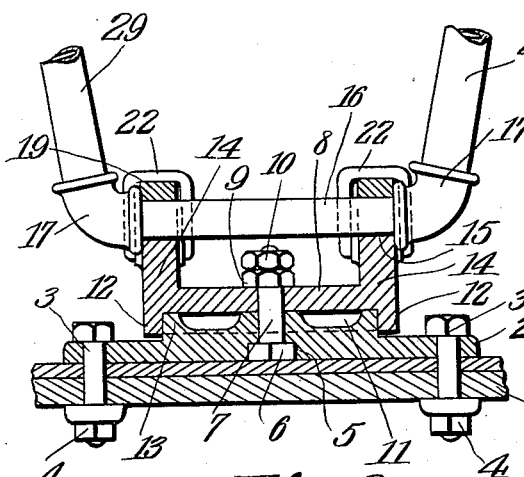

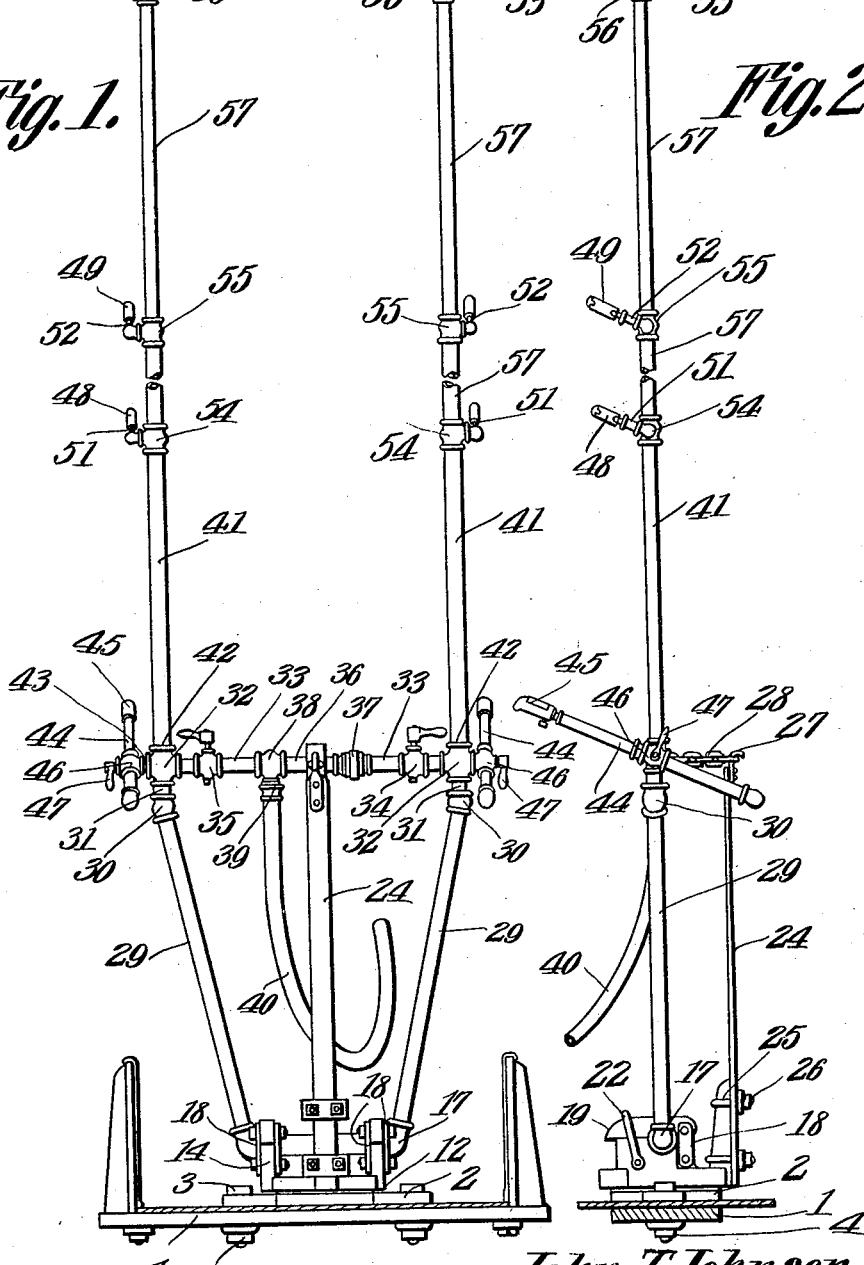

J. T. JOHNSON.
FLUID SPRAYING DEVICE.
APPLICATION FILED SEPT. 30, 1910.

1,023,852.

Patented Apr. 23, 1912.
2 SHEETS—SHEET 2.

Witnesses

John T. Johnson
Inventor,
by C. A. Snow & Co.
Attorneys.

UNITED STATES PATENT OFFICE.

JOHN T. JOHNSON, OF WILLIAMSTOWN, WEST VIRGINIA.

FLUID-SPRAYING DEVICE.

1,023,852. Specification of Letters Patent. Patented Apr. 23, 1912.

Application filed September 30, 1910. Serial No. 584,740.

*To all whom it may concern:*

Be it known that I, JOHN T. JOHNSON, a citizen of the United States, residing at Williamstown, in the county of Wood and State of West Virginia, have invented a new and useful Fluid-Spraying Device, of which the following is a specification.

This invention relates to spraying devices, and it more especially pertains to a new and useful watering or spraying device, which is capable of being made extensible, in order to vary the height of the uppermost nozzles thereof, so as to reach trees of various heights.

One of the objects of said invention is to provide a device of this character which may be adjusted at various angles, and which is capable of being revolved regardless of the position assumed by the sectional pipes and the conveyance upon which the device is arranged.

A still further object of the invention is to provide means whereby the device when thrown in certain angles may be held yieldably so, and when released, thrown automatically back to its initial position.

Another object of the invention is to provide means whereby the various pipes including the nozzles, may be thrown independently at various angles, regardless of the position assumed by the conveyance and the pipes. When it is desired to throw the pipes including the nozzles in various angles, the tubes are inclined forwardly, rearwardly or laterally, in order to be reached by the operator.

The tubes or pipes of the device are constructed in sections, any one of which may be removed if so desired, or others added, in order to spray trees whether tall, medium, or extremely short, or bushes and vines.

The invention, further aims to provide an apparatus, which is portable by means of a conveyance to which the stationary part of the turn-table may be fixed.

Upon examining the drawings in connection with this specification, it will be manifest that as the device is thrown in various angles and at the same time revolved, that the water or any other suitable spraying fluid may be permitted to flow through the pipes and emanate from the various nozzles.

Another object of the invention is to provide means whereby the water or spraying fluid may be entirely cut off.

Attention is called to the drawings in which are shown two devices for entirely cutting off the flow of water, and that one or the other of these devices may be manipulated in such a manner as to cut off the flow of water through one pipe or tube, in order to cause a greater force of water through the other tube. By this method, if one or the other of the tubes is stopped up or clogged, it may be cleared.

To produce the revolving movement for the apparatus, it will be observed that there is provided a turn-table at the base of the vertically arranged pipes, and with a portion of which the said pipes are pivotally connected in order to have a pivotal action. By this provision, it will be noted that the pipes are permitted to have a universal movement, regardless of the position assumed by the conveyance.

It will be further noted that in order to permit the device to be held yieldable in various positions, a counter balance spring is provided, between which and a transverse pipe, a chain is arranged, and after the device is thrown at an inclination, the counter balance spring returns it to its initial position and maintains its equilibrium.

Figure 4:
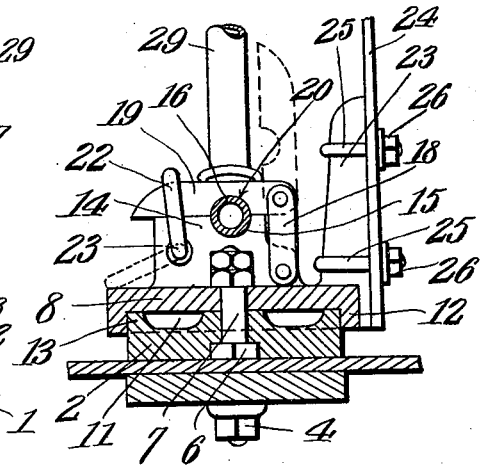
Figure 5:
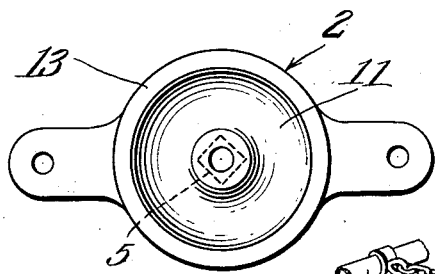
Figure 6:
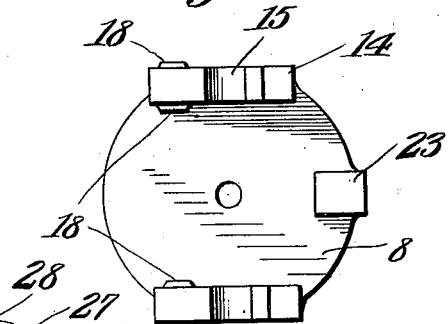
Figure 7:
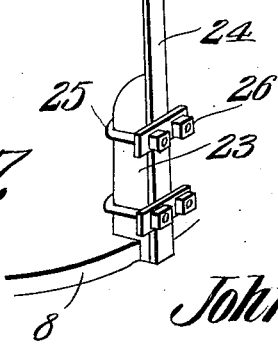

In the drawings:— Figure 1 is a view in elevation, showing the watering or spraying apparatus as installed in the body of a conveyance. Fig. 2 is a view in side elevation of the apparatus. Fig. 3 is a view in section, showing the parts on an enlarged scale, of the turn-table for the apparatus. Fig. 4 is a side view of the structure shown in Fig. 3, showing parts in elevation and parts in section. Fig. 5 is a top plan view of the lower plate or member of the turn-table. Fig. 6 is a plan view of the upper plate or member of the turn-table. Fig. 7 is a detail view, showing a portion of the transversely disposed pipe and the counter balance spring, with a section of chain arranged between them.

As to the accompanying drawings, 1 designates the body of a suitable conveyance, to the bottom of which the lower plate 2 of the table is fixed by means of the bolts and nuts 3 and 4. The under face of this plate 2 is recessed annularly as at 5 in order to receive the head 6 of the bolt 7. This bolt 7 extends upwardly and through the plate 8 of the turn table, and upon the threaded end of this bolt the nut 9 and the lock nut 10 are applied. The upper face of the plate 2 is recessed annularly as at 11, in order to decrease the amount of metal in the plate, whereby the friction between the two plates will be somewhat lessened. The plate 8 is provided with downwardly projecting portions 12, which engage the annular flange 13 of the plates 2. By this construction it will be observed that the plate 8 is guided when it is revolved, and is maintained in the center by means of the bolt 7 and the said portions 12.

Upon each side of the plate 8 are the integral lugs or projecting portions 14, the upper parts of which are recessed as at 15, as shown in Figs. 3, 4 and 6. Arranged in these recesses 15 is the transversely arranged tubular member or rod 16, to each end of which an elbow 17 is threaded. Connected to the portions 14 by means of the plates 18 are the clamping members 19, one being shown as raised in dotted lines in Fig. 4. These clamping members are recessed as at 20 to coact with the recesses 15 in order to hold the transversely arranged tubular member or rod 16 in place, that is to say, when the clamping members 19 are thrown in locked positions, as shown in Figs. 2, 3 and 4. When the clamping members 19 are thrown in locked positions, there are means provided for holding them so, which consist of loops 22 which are fulcrumed at 23 to the portions 14, as shown in Figs. 2 and 4. By this construction it will be observed that the transversely arranged tubular member or rod 16 may be prevented from having upward displacement, yet permitted to rotate in its bearings. This transverse tubular member or rod is rotated in its bearings when the water or spraying device is thrown in various angles.

Carried by and integral with the plate 8 of the turn-table is an upstanding arm or post 23, to which the balance spring 24 is secured by means of the staples 25. These staples 25 embrace the upstanding arm or post 23, as shown in Figs. 2 and 4, the ends of the staples pass through the lower portion of the balance spring and are provided with nuts 26, whereby the staples and the balance spring are held in position securely. This balance spring tapers upwardly to a small point, and the extremity thereof is formed with a hooked end 27, to which the link chain 28 is connected, the purpose of which will presently appear.

Threaded into the elbows 17 are the pipes 29 to the upper ends of which unions 30 are provided. Connected to the unions are the pipes 31. These pipes 31 enter and are threaded to the four-way unions 32. Connected to and extending into one side of the unions 32 are the pipes 33, in which are located the valves 34 and 35, which may be utilized for cutting off the entire flow of water or other spraying fluid. Connected between the pipes 33 is an intermediate pipe 36, the ends of which extend into and are connected to the unions 37 and 38. By these pipes 33 and 36, a transversely arranged conduit or pipe is provided, connecting the pipes 29 and 31, in order to hold them braced and rigidly disposed relatively to one another. The union 38 not only affords connecting means between the pipe 36 and one of the pipes 33, but also affords a connection as at 39 for the water supply pipe 40. This water supply pipe is designed to be connected to any suitable source of water supply under pressure (not shown), so as to force water through the vertically arranged sectional pipes 41, which are threaded into the unions 32, as shown at 42.

Threaded into the unions 32 are the coupling pipes 43, which are provided with oscillating pipes 44. These oscillating pipes 44 at their outer extremities are provided with spraying nozzles 45 which may be any desired height or construction. These oscillating pipes 44, where they form a junction with the coupling pipes 43, are provided with valves 46 which may be of any desired construction. By the valve handles 47 the flow of water or other fluid through the nozzles 45 may be independently controlled. The water or spraying fluid through one may be controlled independently of the other, and vice versa. The flow of the fluid through these oscillating pipes 44 may not only be controlled independently of one another, but also be controlled independently of the various other nozzles 48, 49 and 50. These nozzles 48, 49 and 50 are carried by the extremities of the pipes 51, 52 and 53, which are threaded to the unions 54, 55 and 56. By the unions 54, 55 and 56 the sections 57 of the vertically arranged pipes 41 are connected together. It will be observed, however, that by removing the upper unions 56, and arranging in their stead unions similar to the unions 54 and 55, other sections of pipes may be connected with the sections 57. As many sections as desired may be connected in a similar manner, in order to extend the height of the vertically arranged pipes 41. It will also be observed that the various nozzles 48, 49 and 50 may be arranged at different angles, one may be arranged independently of the other and vice versa.

The intermediate section between the pipes 33 has connected to it the chain 28, and it will be noted that by the operator taking hold of any part of the apparatus, say for instance, the pipes 33 and the pipe 36, the apparatus may be tilted at an inclination and yieldably held so by means of the balance spring 24. When the apparatus is released from such yieldable position, the same may be returned to its initial position by the resiliency of the spring, with hardly any exertion on the part of the operator.

When the apparatus is returning to its initial position from the yieldable position, the same slightly vibrates before assuming a still upright position. The operator may, if it is desired, steady the apparatus when returning to its initial position in order to obviate the possibility of the device vibrating. However, if the operator desires to permit the apparatus to vibrate, he may to a better advantage water or spray various parts of trees, or bushes, or vines; in other words, the water or other fluid will cover a greater area of the vines or bushes.

It will be noted that by the provision of the turn-table, at the base of the pipes 29, the spraying apparatus may be rotated to assume various positions, at the same time that the apparatus is tilted at an angle.

The invention having been set forth, what is claimed as new and useful is:

1. The combination with a movable body, and spraying pipes with nozzles, including a horizontal pipe at the bottom; of a turntable embodying clamping members to embrace the horizontal pipe to retain it in position upon the turn-table, and pivoted loops to engage the clamping members.

2. The combination with a portable body, and spraying pipes with nozzles, including a horizontal pipe at the bottom; of a turntable therefor having upwardly extending portions upon each side thereof, said portions embodying clamping members linked thereto and provided with pivoted locking loops to engage said clamping members.

3. The combination with a portable body, and spraying pipes including a horizontally disposed pipe, provided with nozzles; of a turn table therefor, a balance spring carried by said turn table, said spring having a connection with said horizontally disposed pipe.

In testimony that I claim the foregoing as my own, I have hereto affixed my signature in the presence of two witnesses.

JOHN T. JOHNSON.

Witnesses:
 JOHN T. COOPER,
 S. M. JOHNSON.

---

Copies of this patent may be obtained for five cents each, by addressing the "Commissioner of Patents, Washington, D. C."